United States Patent
Kim et al.

(10) Patent No.: US 12,512,705 B2
(45) Date of Patent: Dec. 30, 2025

(54) ALLOY COMPOSITION, ALLOY POWDER, ALLOY RIBBON, INDUCTOR, AND MOTOR

(71) Applicant: KOLON INDUSTRIES, INC., Seoul (KR)

(72) Inventors: Su Min Kim, Seoul (KR); Choongnyun Paul Kim, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 643 days.

(21) Appl. No.: 17/758,647

(22) PCT Filed: Jan. 15, 2021

(86) PCT No.: PCT/KR2021/000638
§ 371 (c)(1),
(2) Date: Jul. 12, 2022

(87) PCT Pub. No.: WO2021/145741
PCT Pub. Date: Jul. 22, 2021

(65) Prior Publication Data
US 2023/0055049 A1   Feb. 23, 2023

(30) Foreign Application Priority Data

Jan. 16, 2020 (KR) .................. 10-2020-0006224
Jan. 16, 2020 (KR) .................. 10-2020-0006225
Jan. 16, 2020 (KR) .................. 10-2020-0006228

(51) Int. Cl.
*H02K 1/02* (2006.01)
*C22C 38/00* (2006.01)
(Continued)

(52) U.S. Cl.
CPC ............. *H02K 1/02* (2013.01); *C22C 38/002* (2013.01); *C22C 38/005* (2013.01); *C22C 38/02* (2013.01);
(Continued)

(58) Field of Classification Search
CPC . C22C 2202/02; C22C 38/002; C22C 38/005; C22C 38/02; C22C 38/16;
(Continued)

(56) References Cited

U.S. PATENT DOCUMENTS

2007/0175545 A1   8/2007   Urata
2010/0097171 A1*  4/2010   Urata .................. C22C 38/002
                                                     420/83

FOREIGN PATENT DOCUMENTS

CN   104934179 A    9/2015
CN   107851507 A *  3/2018   ......... H01F 1/15308
(Continued)

OTHER PUBLICATIONS

NPL: on-line translation of CN-107851507-A, Mar. 2018 (Year: 2018).*
CN Office Action Dated Apr. 30, 2025.

*Primary Examiner* — Jie Yang
(74) *Attorney, Agent, or Firm* — Harvest IP Law, LLP

(57) ABSTRACT

A soft magnetic core of an inductor or a motor core includes an alloy having a composition of Fe, Si, B, P, Cu, and Y, and the soft magnetic core or the motor core has a composite structure in which crystal grains including Fe are dispersed in an amorphous phase. Also, the alloy is expressed by the compositional formula $Fe_aSi_bB_cP_dCu_eY_fC_g$, wherein a to g satisfy $80 \leq a \leq 87$, $0 \leq b \leq 9$, $3 \leq c \leq 14$, $1 \leq d \leq 8$, $0.2 \leq e \leq 2.5$, $0 \leq f \leq 3.0$, $0 \leq g \leq 4.0$, and $0 \leq (e/f) \leq 4$ in terms of atomic percentage value.

15 Claims, 7 Drawing Sheets

(51) Int. Cl.
    *C22C 38/02*         (2006.01)
    *C22C 38/16*         (2006.01)
    *H02K 1/12*          (2006.01)
    *H02K 1/22*          (2006.01)
    *H02K 5/04*          (2006.01)

(52) U.S. Cl.
    CPC ............... *C22C 38/16* (2013.01); *H02K 1/12* (2013.01); *H02K 1/22* (2013.01); *H02K 5/04* (2013.01); *C22C 2202/02* (2013.01)

(58) Field of Classification Search
    CPC .... H01F 1/15308; H01F 1/15333; H01F 3/04; H01F 3/08; H02K 1/02; H02K 1/12; H02K 1/22; H02K 5/04
    See application file for complete search history.

(56) References Cited

FOREIGN PATENT DOCUMENTS

| | | | |
|---|---|---|---|
| JP | 2007270271 | A | 10/2007 |
| JP | 6506854 | B2 | 4/2019 |
| KR | 1020120114850 | A | 10/2012 |
| KR | 20160018013 | A | 2/2016 |
| KR | 1020160018013 | A | 2/2016 |
| KR | 1020180034532 | A | 4/2018 |
| KR | 1020180043859 | A | 4/2018 |
| WO | 2017/086102 | A1 | 5/2017 |

\* cited by examiner

[FIG. 1]
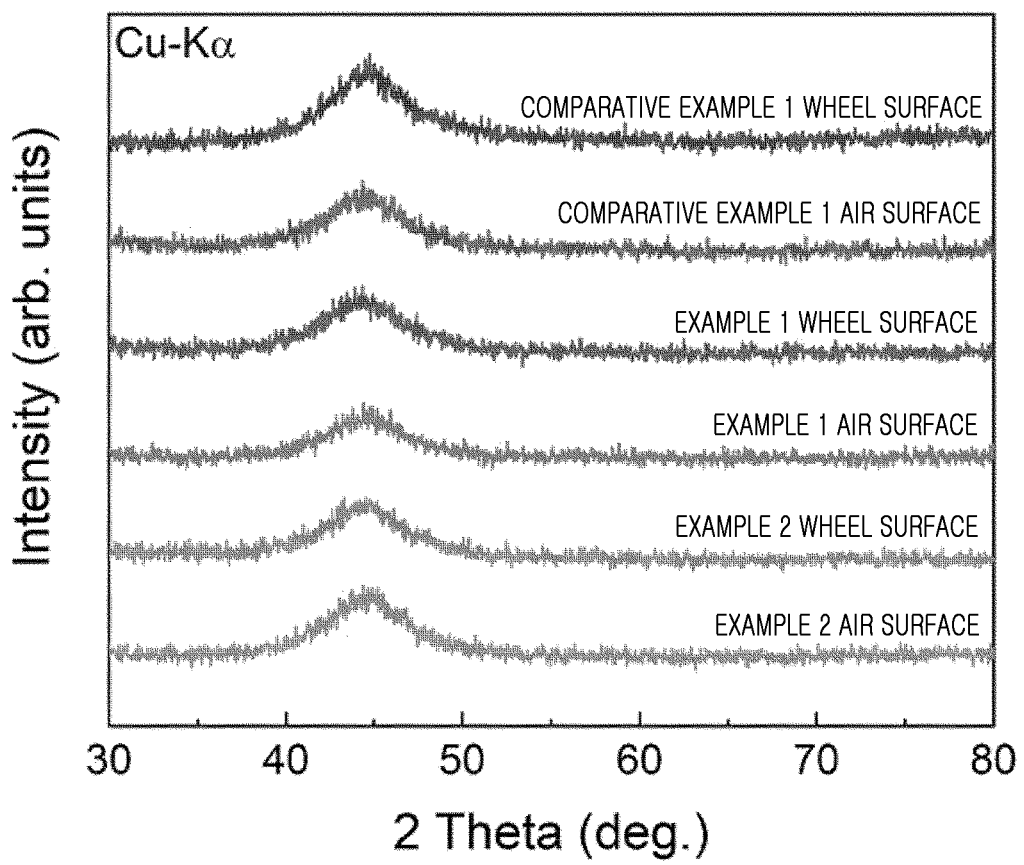

[FIG. 2]
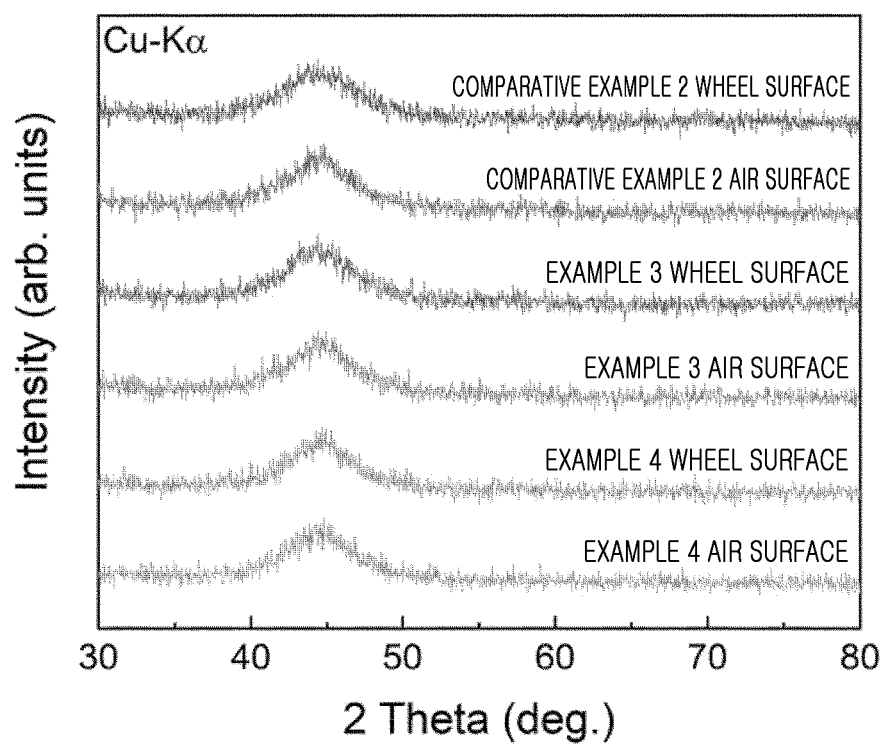

[FIG. 3]
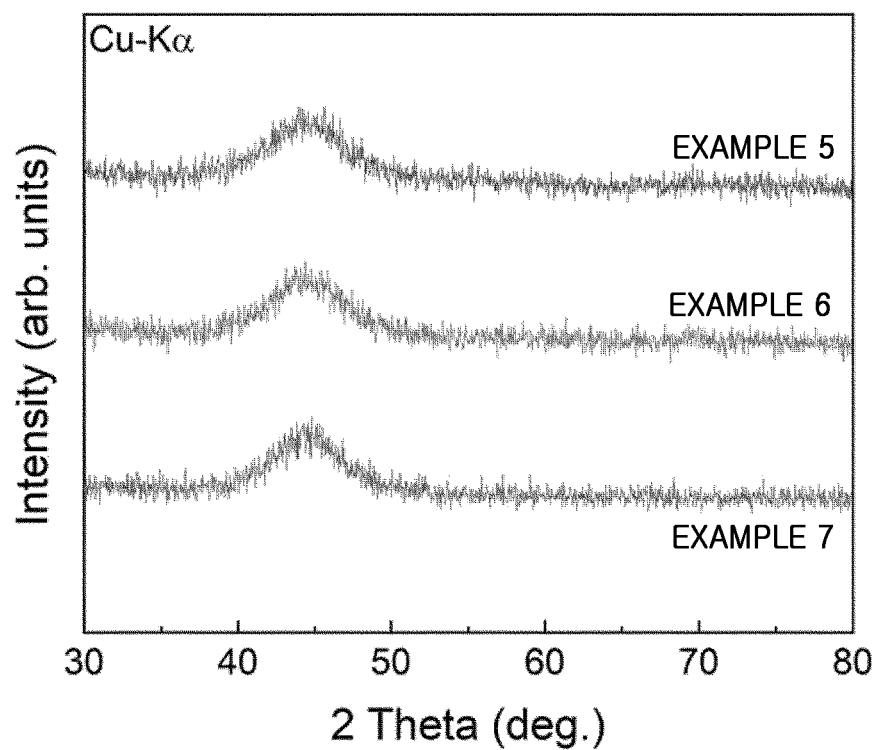

[FIG. 4]
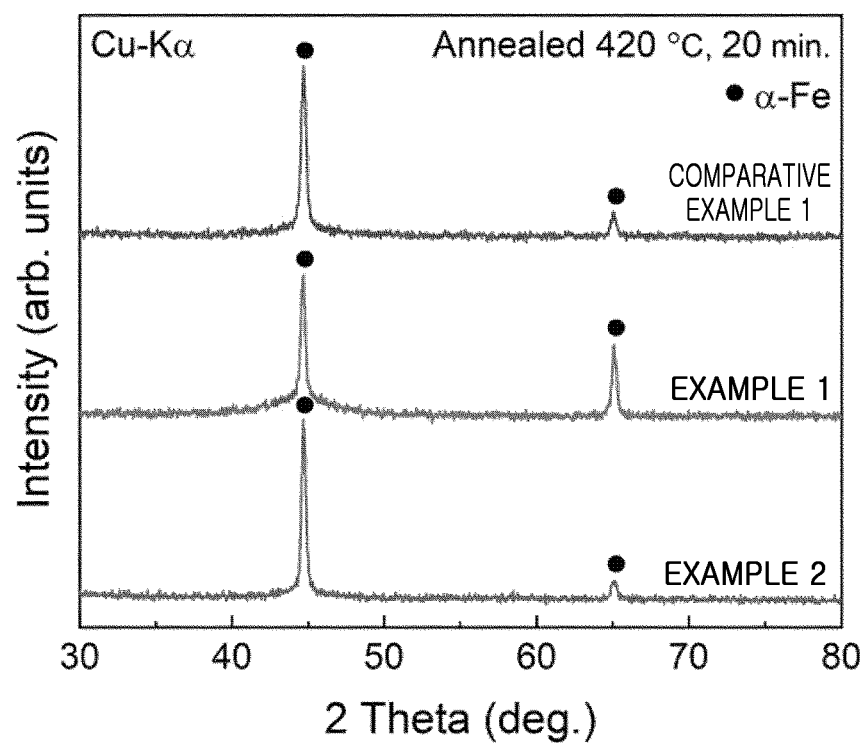

[FIG. 5]
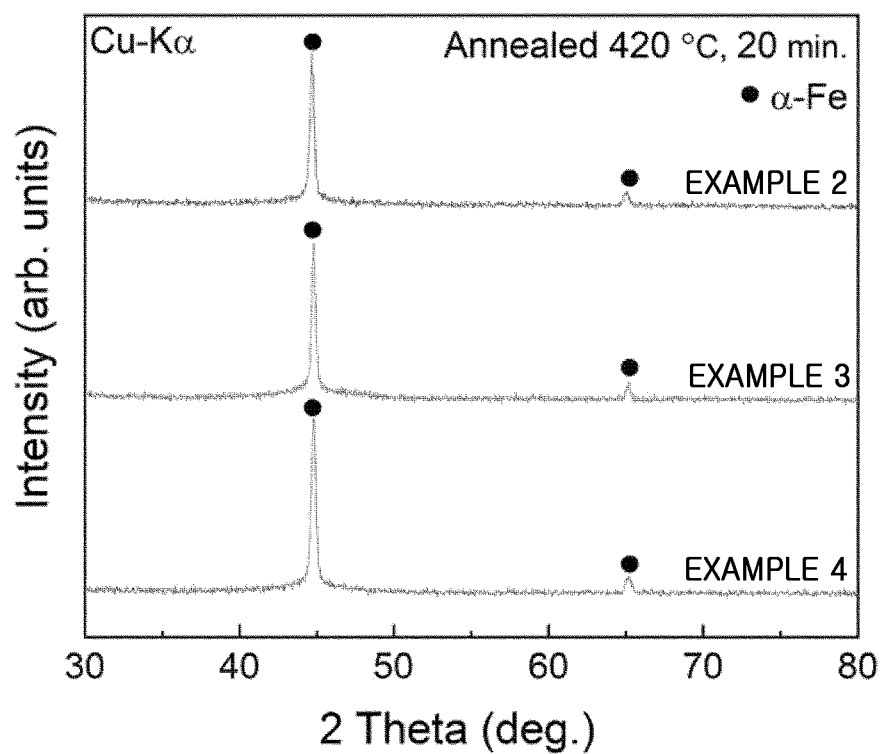

[FIG. 6]
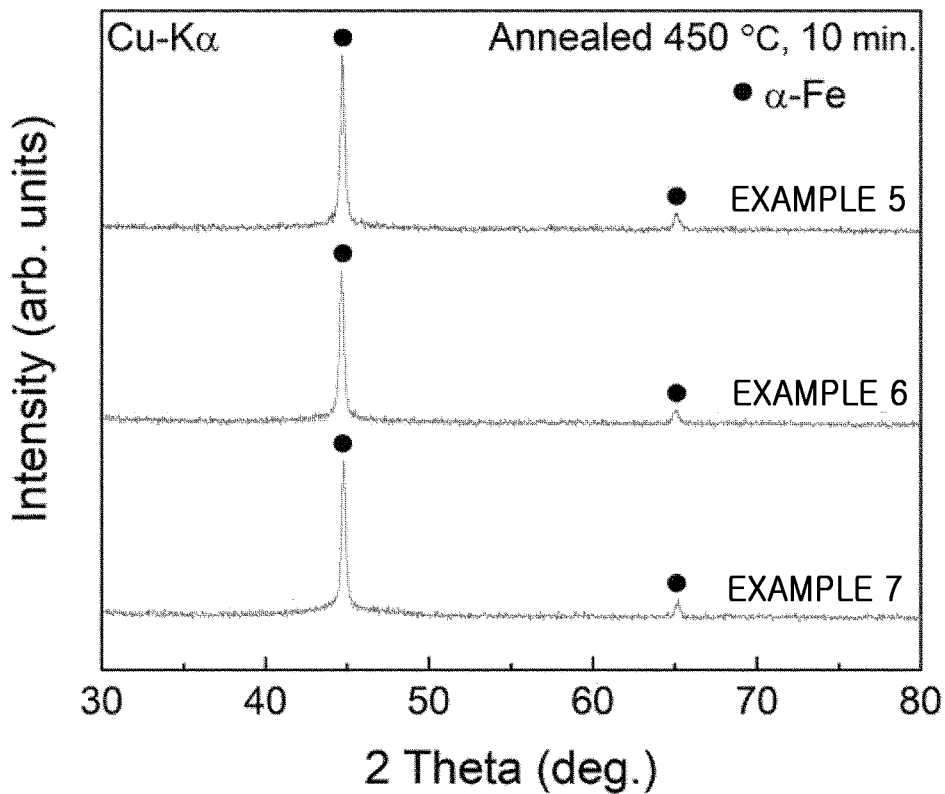
[FIG. 7]
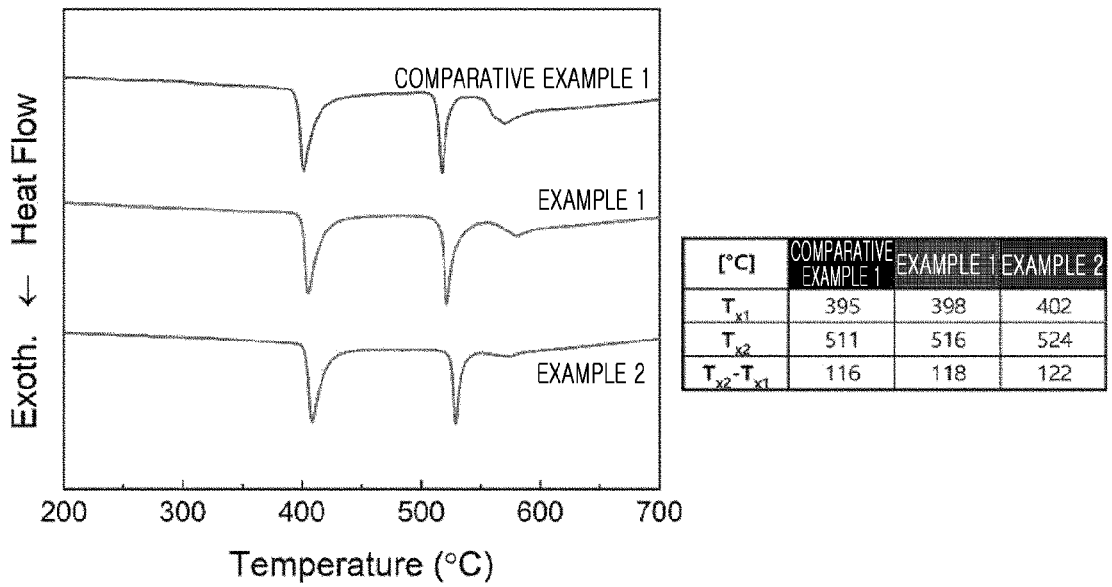

[FIG. 8]
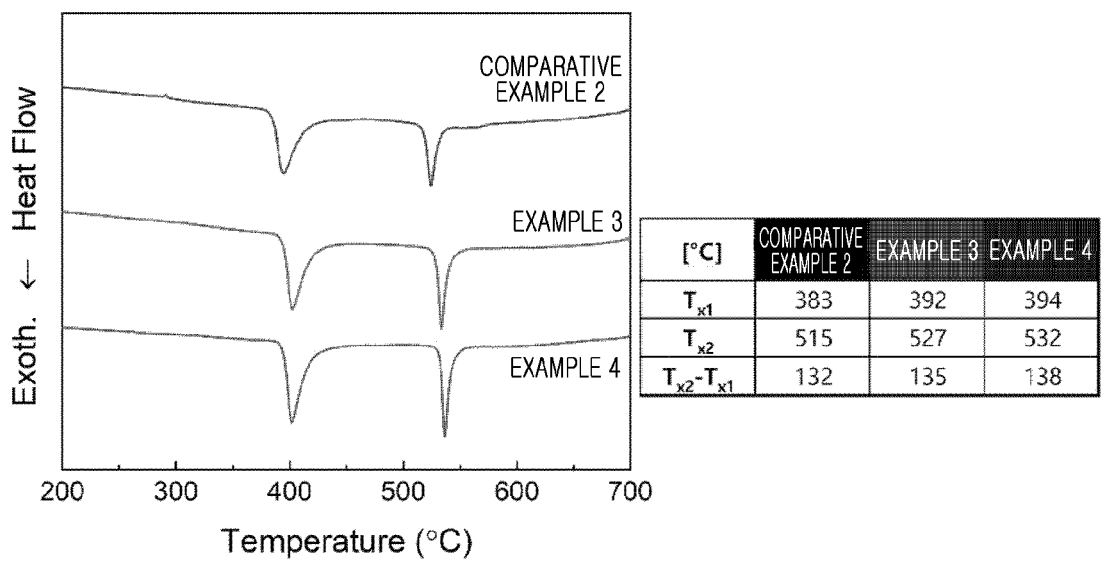
[FIG. 9]
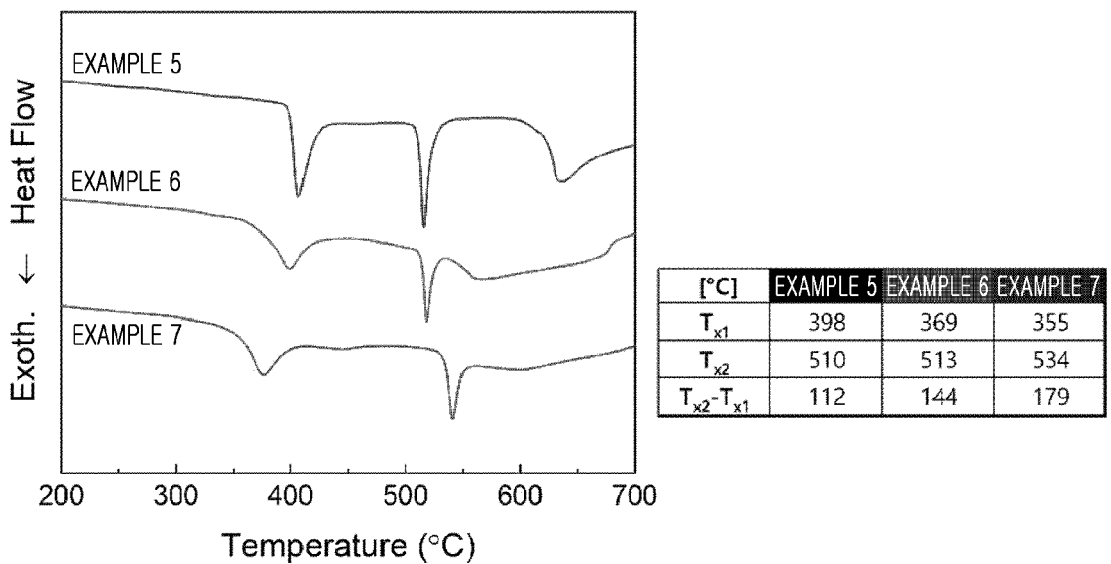

ALLOY COMPOSITION, ALLOY POWDER, ALLOY RIBBON, INDUCTOR, AND MOTOR

CROSS REFERENCE TO RELATED APPLICATIONS

This application is a National Stage of International Application No. PCT/KR2021/000638 filed Jan. 15, 2021, claiming priority based on Korean Patent Application No. 10-2020-0006224, 10-2020-0006225 and 10-2020-0006228 filed on Jan. 16, 2020.

TECHNICAL FIELD

The present disclosure relates to an alloy composition, and more particularly, an alloy composition having excellent soft magnetic properties which may be used in various electrical and electronic fields, an alloy ribbon and an alloy powder having the alloy composition, and an electronic material such as an inductor and a motor using the same.

BACKGROUND ART

A soft magnetic material may be a material essentially included in various electromagnetic materials or components such as various types of transformers, a choke coil, an inductor, a motor, a generator, a magnetic switch, and a sensor. An electrical steel sheet such as silicon steel, permalloy, ferrite, or the like, have been widely known and used as a soft magnetic material, and an amorphous alloy has also been widely used as a soft magnetic material.

Compositions of various alloys have been studied to use an amorphous alloy as a soft magnetic material, and research to use excellent magnetic properties of an Fe-based amorphous alloy has been continuously conducted until recently.

However, a conventional Fe-based amorphous alloy may not have a high magnetic flux density, such that there may be a limitation in improvement of properties. To manufacture an amorphous alloy while reducing current loss caused by an eddy current, a great deal of efforts has been made to manufacture an Fe-based amorphous alloy in the form of a thin strip and a ribbon such as a single roll method, but due to fragility of a material itself and problems of automation of a production line, research has been actively conducted to manufacture and commercialize a soft magnetic alloy powder which may be easily formed into various three-dimensional shapes.

Meanwhile, when a soft magnetic alloy is prepared as a powder, a cooling rate may be lower than that of an alloy ribbon manufacturing method such as a single roll method, such that crystallization may easily occur in the process of cooling the alloy, and accordingly, a high amorphous ratio may not be obtained, which may be problematic. Accordingly, a technique of manufacturing an alloy powder including an amorphous phase in a high ratio and solutions for an amorphous alloy composition may also be necessary.

Recently, to improve soft magnetic properties of an amorphous alloy, such as saturation magnetic flux density and permeability, a nanocrystalline alloy in which crystalline Fe may be formed as nanometer-sized particles may be manufactured, and demand for an alloy material having excellent soft magnetic properties has increased in particular. However, additional problems in which nanocrystals included in a nanocrystalline alloy may be non-uniformly formed or corrosion resistance may be reduced due to nanocrystalization have appeared after a nanocrystalline alloy is manufactured as well.

DISCLOSURE

Technical Problem

An alloy composition according to an aspect of the present disclosure may be an alloy composition having excellent glass forming ability, and a purpose of the present disclosure is to provide an alloy composition which may allow stable crystallization during heat treatment of an alloy ribbon or alloy powder formed of the alloy composition due to a large difference between a first crystallization temperature and a second crystallization temperature of the alloy composition.

Also, as for the alloy composition in the above aspect, fine and uniform Fe crystal grains, formed during nanocrystallization, may be obtained, and a purpose of the present disclosure is to provide a uniform quality of soft magnetic material.

Another aspect of the present disclosure is to provide a soft magnetic core including an Fe-based alloy having a high saturation magnetic flux density, including homogeneous nanocrystal grains dispersed therein by heat treatment, and having a structure including an amorphous phase, and an inductor including the same.

Another aspect of the present disclosure is to provide a motor core including an Fe-based alloy having a high saturation magnetic flux density, including an amorphous phase, and having excellent corrosion resistance, and a motor having a stator or a rotor including the same.

Technical Solution

An aspect of the present disclosure is expressed by a compositional formula $Fe_aSi_bB_cP_dCu_eY_fC_g$, and a to g may satisfy $80 \leq a \leq 87$, $0 \leq b \leq 9$, $3 \leq c \leq 14$, $1 \leq d \leq 8$, $0.2 \leq e \leq 2.5$, $0 \leq f \leq 3.0$, $0 \leq g \leq 4.0$, and $(e/f) \leq 4$ in an atomic percentage value.

In this case, the compositional formula may satisfy $10 \leq (c+d+f) \leq 19$, the compositional formula may satisfy $0.80 < (d/e) \leq 1.0$, and the compositional formula may satisfy $0.5 \leq f \leq 2.5$.

Also, the alloy composition may be represented by a compositional formula $Fe_aSi_bB_cP_dCu_eY_f$.

A difference between a first crystallization temperature ($T_{x1}$) and a second crystallization temperature ($T_{x2}$) of the alloy composition may be 120 to 200° C.

A difference between a first crystallization temperature ($T_{x1}$) and a second crystallization temperature ($T_{x2}$) of the alloy composition may preferably be 170 to 190° C.

As another embodiment of the present disclosure, an alloy ribbon formed of the aforementioned alloy composition, and including crystal grains including Fe and an amorphous phase in which the crystal grains are dispersed may be provided, and an alloy powder formed of the aforementioned alloy composition may also be provided preferably.

The alloy powder includes crystal grains including Fe and an amorphous phase in which the crystal grains are preferably dispersed.

Another aspect of the present disclosure may be an inductor including a wound coil; and
  a soft magnetic core including the coil therein,
    wherein the soft magnetic core includes an alloy having a composition of Fe, Si, B, P, Cu and Y, and has a composite structure in which crystal grains including Fe are dispersed in an amorphous phase preferably.

Alternatively, an inductor including a soft magnetic core including an alloy having Fe, Si, B, P, Cu and Y as a composition; and a coil wound on a surface of the soft magnetic core, wherein the soft magnetic core has a composite structure in which crystal grains including Fe are dispersed in an amorphous phase.

In this case, the soft magnetic core may be a sintered body in which the alloy powder having the composition may be insulated from each other and may be sintered.

A difference between a first crystallization temperature ($T_{x1}$) and a second crystallization temperature ($T_{x2}$) of the alloy may be 120 to 200° C.

The alloy may be expressed by a compositional formula $Fe_aSi_bB_cP_dCu_eY_fC_g$, a to g may satisfy 80≤a≤87, 0≤b≤9, 3≤c≤14, 1≤d≤8, 0.2≤e≤2.5, 0≤f≤3.0, 0≤g≤4.0, and (e/f)≤4 in an atomic percentage value.

The compositional formula may satisfy 10≤(c+d+f)≤19, the compositional formula may satisfy 0.80<(d/e)≤1.0, and the compositional formula may satisfy 0.5≤f≤2.5.

The alloy may be expressed by a compositional formula $Fe_aSi_bB_cP_dCu_eY_f$, and a to f may satisfy 80≤a≤87, 0≤b≤9, 3≤c≤14, 1≤d≤8, 0.2≤e≤2.5, 0≤f≤3.0, and (e/f)≤4 in an atomic percentage value.

Crystal grains including Fe may include α-Fe.

An average particle diameter of crystal grains including Fe may be 25 nm or less.

According to another aspect of the present disclosure, a motor includes:

a housing; a rotation shaft supported by a center of the housing; a rotor connected to the rotation shaft; and a stator fixed to the housing, the rotor or the stator includes a motor core on which a coil may be wound, the motor core includes an alloy having Fe, Si, B, P, Cu and Y as a composition, and a complex structure in which crystal grains including Fe are dispersed in an amorphous phase may be included.

In the motor core, the alloy may be processed into a soft magnetic alloy ribbon and the ribbon may be laminated, and in the motor core, the soft magnetic alloy ribbon may be laminated in a direction perpendicular to a winding direction of the coil.

A difference between a first crystallization temperature ($T_{x1}$) and a second crystallization temperature ($T_{x2}$) of the alloy may be 120 to 200° C.

Also, the alloy may be expressed by a compositional formula $Fe_aSi_bB_cP_dCu_eY_fC_g$, and a to g satisfy 80≤a≤87, 0≤b≤9, 3≤c≤14, 1≤d≤8, 0.2≤e≤2.5, 0≤f≤3.0, 0≤g≤4.0, and (e/f)≤4 in an atomic percentage value.

The compositional formula may satisfy 10≤(c+d+f)≤19, the compositional formula may satisfy 0.80<(d/e)≤1.0, and the compositional formula may satisfy 0.5≤f≤2.5.

The alloy may be expressed by a compositional formula $Fe_aSi_bB_cP_dCu_eY_f$, and a to f satisfy 80≤a≤87, 0≤b≤9, 3≤c≤14, 1≤d≤8, 0.2≤e≤2.5, 0≤f≤3.0, and (e/f)≤4 in an atomic percentage value.

The crystal grains including Fe include α-Fe, and an average particle diameter of the crystal grains including Fe may be 25 nm or less.

Advantageous Effects

An alloy composition according to an aspect of the present disclosure may be a soft magnetic alloy composition having a Fe—Si—B—P—Cu—Y-based composition, and a difference between first and second crystallization temperatures may increase by including Y.

Also, in the alloy composition, since contents of Cu atoms and Y atoms in a compositional formula satisfies a specific relationship, a difference between the second crystallization temperature and the first crystallization temperature may greatly improve, such that there may be an advantage in that a stable process design may be obtained when a soft magnetic material is manufactured through heat treatment, and a soft magnetic material having excellent quality may be manufactured.

Also, when a heat treatment is performed on an alloy ribbon or an alloy powder prepared from the alloy composition, the alloy ribbon or the alloy powder may include an amorphous phase in which Fe crystal grains are dispersed, such that a high saturation magnetic flux density may be obtained.

An inductor according to a third aspect of the present disclosure may include a soft magnetic core formed of a soft magnetic alloy having an improved glass forming ability, and the soft magnetic alloy may include a composite structure in which Fe-based nanocrystal grains obtained by heat treatment are dispersed, such that a saturation magnetic flux density may be obtained.

Also, since a soft magnetic core of the inductor may have an advantage in which a difference between a first crystallization temperature and a second crystallization temperature may be large, a composite structure including homogeneous nanocrystal grains may be easily obtained.

A motor according to a fourth aspect of the present disclosure may include a motor core formed of an alloy of a composition further including yttrium, which is a rare earth element, in an Fe-based alloy, and a corrosion resistance problem which may occur when an Fe-based amorphous alloy is used as a motor core of a stator or a rotor of the motor may be addressed, such that lifespan of components and devices may improve.

Also, the motor according to the above aspect may have a large difference between the first crystallization temperature and the second crystallization temperature, such that it may be easy to manufacture a composite structure including an amorphous phase in which Fe-based nanocrystal grains are uniformly dispersed through heat treatment, and a saturation magnetic flux density may be excellent, which may be advantageous.

BRIEF DESCRIPTION OF DRAWINGS

FIGS. 1 to 3 are graphs illustrating results of XRD analysis of alloy compositions of a portion of examples and comparative examples;

FIGS. 4 to 6 are graphs illustrating results of XRD analysis of alloy ribbons manufactured after forming and heat treatment of alloy compositions of a portion of examples and comparative examples; and FIGS. 7 to 9 are results of DSC analysis of a portion of examples and comparative examples.

BEST MODE FOR INVENTION

Before describing the present disclosure in detail below, the terms used herein may be provided to describe specific embodiments, and may not be intended to limit the scope of the present disclosure, which is limited only by the appended claims. It should be understood that all the technical and scientific terms used herein may have the same meaning as commonly understood by those of ordinary skill in the art, unless otherwise indicated.

Throughout this specification and claims, unless otherwise indicated, the term "comprise, comprises, and comprising" may include a mentioned object, step or group of objects, and processes, and may not exclude any other object, step, or group of objects or groups of processes.

Meanwhile, various embodiments of the present disclosure may be combined with any other embodiments unless otherwise indicated. Any feature indicated as particularly preferred or advantageous may be combined with any other feature or features indicated as preferred or advantageous.

In the drawings, a width, length, thickness, or the like of the components may be exaggerated for ease of description. As a whole, the drawings may be described in an observer's point of view, and when it is said that one component is "above/below" or "above/below" another component, the description may include an example in which another component is "directly above/below" the one component and an example in which another component is provided therebetween.

In the present specification, amorphous refers to non-crystallinity, and refers to a property of a structure including an amorphous phase which is a phase in which crystals are not formed in a solid, that is, a regular structure is not formed.

A first aspect of the present disclosure is an alloy composition, and the alloy composition may be FeSiBPCuY or an FeSiBPCuYC-based soft magnetic alloy composition including Fe, Si, B, P, Cu and Y.

More specifically, the alloy composition may be expressed as $Fe_aSi_bB_cP_dCu_eY_fC_g$ in atomic percent, where $80 \leq a \leq 87$, $0 < b \leq 9$, $3 \leq c \leq 14$, $1 \leq d \leq 8$, $0.2 \leq e \leq 2.5$, $0 < f \leq 3.0$ and $0 \leq g \leq 4.0$ may be satisfied, and a sum of a, b, c, d, e, f, and g may satisfy 100.

Alternatively, the alloy composition may be expressed as $Fe_aSi_bB_cP_dCu_eY_f$ in atomic percent, where $80 \leq a \leq 87$, $0 < b \leq 9$, $3 \leq c \leq 14$, $1 \leq d \leq 8$, $0.2 \leq e \leq 2.5$ and $0 < f \leq 3.0$ may be satisfied, and a sum of a, b, c, d, e, f may satisfy 100.

In this case, a value of (c+d+f) may be preferably 10 to 19, and a value of (e/f) may be preferably 4 or less.

Here, Fe may be a main element of the alloy composition, and may be an essential element responsible for magnetism. A content of Fe may be preferably 80 to 87 atomic %, preferably 80.5 to 86 atomic %, and more preferably 81 to 85 atomic %. When Fe is lower than the corresponding range, a saturation magnetic flux density of the alloy composition may be low, such that soft magnetic properties may not be high, and manufacturing costs may increase. When Fe is higher than the corresponding range, the amorphous phase may not be formed or a ratio of the amorphous phase may be lowered, and a homogeneous nanocrystalline structure may not be obtained during heat treatment, such that soft magnetic properties of the soft magnetic material obtained from the alloy composition may be deteriorated.

Hereinafter, the soft magnetic material refers to an object in a state obtained by cooling and performing heat treatment on the soft magnetic alloy composition, and may include a soft magnetic material and a soft magnetic component formed into a desired shape.

As for the soft magnetic alloy composition, Si element may be an element responsible for amorphous formation, and may contribute to stabilization of nanocrystals during nanocrystallization of the soft magnetic alloy composition. A content of Si may preferably exceed 0 atomic %, preferably 9 atomic % or less, and preferably 1 to 7 atomic %.

When the content of Si is lower than the corresponding range, a glass forming ability of the alloy composition may be lowered, such that it may be difficult to form an amorphous alloy, and when a nanocrystal structure is formed, a homogeneous nanocrystal structure may not be obtained, such that soft magnetic properties of the soft magnetic material may be poor. When the Si content is higher than the corresponding range, a saturation magnetic flux density and a glass forming ability may rather be deteriorated, which may be problematic.

Since the soft magnetic alloy composition includes Si in the corresponding range, $\Delta T$, which is a difference between first and second crystallization temperatures in the soft magnetic alloy composition, may increase, and a soft magnetic material including homogeneous nanocrystal grains may be obtained.

In the soft magnetic alloy composition, B may be mainly included to improve a glass forming ability.

A content of B may be preferably 3 to 14 atomic %, preferably 3.5 to 13 atomic %.

When the content of B is lower than the corresponding range, a glass forming ability may be lowered, such that an amorphous phase may not be obtained or may be obtained at a low ratio, such that soft magnetic properties may be poor. When the content is higher than the corresponding range, $\Delta T$ of the alloy composition may decrease, such that it may be difficult to obtain homogeneous nanocrystal grains in the soft magnetic material, and soft magnetic properties may be poor.

Also, as B is a light element, B may be volatilized or it may be difficult to alloy B during preparation of the alloy composition, and accordingly, B may be included in a lower content in the alloy actually obtained than in a target composition.

P may improve a glass forming ability of the alloy composition, and when P is included in the alloy together with Si or B, P may improve a glass forming ability and stability of nanocrystal grains.

The content of P may be preferably 1 to 8 atomic %, preferably 1.5 to 7.5 atomic %. When the content of P is lower than the corresponding range, a glass forming ability may be lowered and it may be difficult to sufficiently obtain an amorphous phase, and when the content is higher than the corresponding range, the saturation magnetic flux density of the soft magnetic alloy or soft magnetic material may be lowered, and soft magnetic properties may be deteriorated, which may be problematic.

C may be an element selectively included in the soft magnetic alloy composition, and a radius of the atom may be relatively small, such that C may contribute to improvement of a glass forming ability by a principle similar to that of boron. A content of carbon may be preferably 0 to 4 atomic %. However, when the content of carbon exceeds 4 atomic %, an Fe-based alloy may be brittle and may be easily embrittled, such that soft magnetic properties may be deteriorated.

In the soft magnetic alloy composition, Cu may act as an element contributing to nanocrystallization of the alloy. A content of Cu may be preferably 0.2 to 2.5 atomic %, preferably 0.3 to 2.0 atomic %, and more preferably 0.4 to 1.7 atomic %.

When the Cu content is lower than the corresponding range, nanocrystallization may not be properly performed such that the effect of improving soft magnetic properties of the soft magnetic material by nanocrystallization may be deteriorated, which may be problematic, and when the content is higher than the corresponding range, the amorphous phase alloy may become non-uniform, and a homogeneous nanocrystalline structure may not be obtained and soft magnetic properties of the soft magnetic material may be deteriorated, which may be problematic.

A strong attractive force may be present between a P atom and a Cu atom. Accordingly, when the alloy composition includes P element and Cu element in a specific ratio, nanometer-sized clusters may be formed, and by the nanometer-sized clusters, crystalline α-Fe may have a microstructure of nanocrystal grains during heat treatment of Fe-based alloys. More specifically, the soft magnetic material according to the present embodiment may be an Fe-based nanocrystal alloy, and may include α-Fe (α-iron, Alpha-iron) crystal grains having an average particle diameter of 25 nm or less.

In the present embodiment, a ratio (d/e) between the content (d) of P and the content (e) of Cu may be 0.05 or more and 1.0 or less, may preferably exceed 0.80 and may be 1.0 or less.

When the (d/e) value is beyond the corresponding range, a homogeneous nanocrystalline structure may not be obtained, and accordingly, soft magnetic properties may not be good in a product manufactured using the alloy composition.

Y may be a rare earth element, and as an atom having a large atomic radius, Y may improve a glass forming ability of the alloy composition, and Y may lower diffusivity or mobility of iron atoms in the alloy composition such that crystallization of atoms included in the alloy may be prevented.

Also, when yttrium is included in the alloy composition, Y may interfere with movement of Fe atoms during nanocrystallization process of the Fe-based alloy during heat treatment, such that an excessive growth of nanocrystal grains may be prevented, and yttrium may maintain a grain size of the nanocrystal grains to be small and may improve stability of the Fe-based nanocrystalline alloy.

Also, yttrium may have excellent bonding strength with oxygen and may react with dissolved oxygen in the alloy composition, such that an oxygen concentration in the alloy composition may be lowered, and formation of oxides of other metals may be prevented, thereby improving mechanical properties such as durability and wear resistance of the alloy may improve and lifespan may be lengthened.

The content of Y may be included within 3.0 atomic %, preferably 0.3 to 2.8 atomic %, more preferably 0.5 to 2.5 atomic %.

When the content of Y is lower than the corresponding range, a glass forming ability may be lowered and it may be difficult to sufficiently obtain an amorphous phase, which may be problematic. When the content of Y is higher than the corresponding range, production costs may increase, and a saturation magnetic flux density of the soft magnetic alloy and the soft magnetic material may be lowered, such that soft magnetic properties may be deteriorated.

The alloy composition of the present disclosure may include all of Cu, Y and P, and in this case, the atomic percentage of B, P and Y may be preferably 10 atomic % or more and 19 atomic % or less in total. When a value of (c+d+f), which is a sum of the contents of B, P and Y, is lower than 10 atomic %, a glass forming ability of the alloy composition may be lowered, such that an amorphous phase may not be formed during the manufacturing of the alloy, which may be problematic, and when the content is higher than 19 atomic %, the content of Fe in the alloy composition may be relatively low, such that nanocrystallization may not be properly performed during heat treatment of the alloy composition, or a saturation magnetic flux density of the finally obtained soft magnetic material may be low, such that soft magnetic properties may be deteriorated.

Also, the value of (e/f), which is a relationship between the yttrium content (f) and the Cu content (e), may be preferably obtained to be 4 or less, and more preferably, the value of (e/f) may be 3 or less. When the value of (e/f) is larger than the corresponding range, the glass forming ability of the alloy composition may be lowered such that a crystalline alloy may be obtained, or the grain size of nanocrystal grains may increase or an irregular nanocrystalline alloy may be obtained during heat treatment to obtain nanocrystalline Fe, which may be problematic.

Also, as energy absorbed from the outside to form a crystalline phase may increase due to the decrease in mobility of atoms by Y, the first crystallization temperature or the second crystallization temperature may increase.

The alloy composition of this aspect may be manufactured and formed to have various shapes. For example, the alloy composition may be cooled to obtain a soft magnetic material, and the soft magnetic material may have a continuous strip shape or a ribbon shape, and may have a powder shape close to a spherical shape.

The continuous strip-shaped soft magnetic material may be formed using a conventional apparatus such as a single roll manufacturing apparatus or a twin roll manufacturing apparatus used for manufacturing an amorphous strip, or the like. The soft magnetic material in a powder form may be produced by a water atomize method or a gas atomize method, and may be obtained by pulverizing or crushing the strip-shaped soft magnetic material, but to prepare a powder having excellent sphericity, it may be preferable to prepare a soft magnetic material in a powder form using an atomization method.

By forming the alloy composition or the soft magnetic material according to the present embodiment, a magnetic core such as a wound core, a laminated magnetic core, or a powder core may be formed. Also, components such as a transformer, an inductor, a motor, and a generator may be provided using the magnetic core.

The alloy composition according to the present embodiment may have an amorphous phase as a main phase. Accordingly, when the cooled alloy composition is heat-treated in an inert atmosphere such as an Ar gas atmosphere, crystallization may occur twice or more. The temperature at which crystallization is first initiated may be referred to as a first crystallization initiation temperature ($T_{x1}$) of the alloy, and the temperature at which the second crystallization is secondarily initiated may be referred to as a second crystallization initiation temperature ($T_{x2}$).

Also, when a temperature difference between the first crystallization initiation temperature ($T_{x1}$) and the second crystallization initiation temperature ($T_{x2}$) is $\Delta T = Tx2 - Tx1$, and the term 'crystallization initiation temperature' is simply used, the temperature may refer to the crystallization initiation temperature ($T_{x1}$).

The crystallization temperature of the above-described alloy may be measured, for example, using a differential scanning calorimetry (DSC) apparatus, and may be evaluated by performing thermal analysis at a temperature increase rate of 20° C./min.

As the alloy composition of the present disclosure includes Y as a composition, $\Delta T$ may increase, and as $\Delta T$ increases, stable nanocrystallization may be available during heat treatment or nanocrystallization of the alloy, and α-Fe of a crystal phase may be obtained uniformly, such that a high saturation magnetic flux density may be obtained, which may be advantageous.

ΔT of the alloy composition may be 120 to 200° C., preferably 130 to 200° C., more preferably 170° C. or more, or may be 190° C. When ΔT is less than the corresponding range, there may be a problem of deterioration of soft magnetic properties of the soft magnetic material after heat treatment.

Since the Fe-based alloy composition according to the present aspect is nanocrystallized such that a soft magnetic material having an excellent saturation magnetic flux density and a coercive force may be formed, and accordingly, the material may be used to manufacture a magnetic core having soft magnetic properties. Also, components such as a transformer, an inductor, a motor, a sensor, or a generator may be manufactured using the magnetic core.

More specifically, the core or magnetic core manufactured from the alloy composition may have a composite structure in which fine grains including Fe are dispersed in an amorphous alloy matrix, and the amorphous alloy matrix may be preferably an amorphous alloy of the composition described above, and the crystal grains including Fe may be homogeneous α-Fe crystalline particles having a particle size of nanometers preferably.

MODE FOR INVENTION

A second aspect of the present disclosure is an alloy powder prepared from the aforementioned alloy composition.

The alloy powder may be prepared by preparing the aforementioned alloy composition in an induction furnace, and pulverizing the alloy composition by an atomizing method. Here, the atomization method is not limited as long as the method is a technique commonly used in the art, and various techniques adopted by a person skilled in the art may be used.

The alloy powder cooled by the atomization method may be an amorphous alloy powder including an amorphous phase, and the amorphous alloy powder may be crystallized by additional heat treatment and may be prepared as a nanocrystalline soft magnetic alloy powder including a nanocrystalline phase therein.

Specifically, as a step of performing a heat treatment on the amorphous alloy powder and nanocrystallizing, a step of treating at a temperature approximate to or higher than the first crystallization initiation temperature may be included.

The step of performing a heat treatment may be preferably performed at a temperature higher than the temperature at which α-Fe nanocrystal grains may be precipitated in an argon atmosphere, that is, higher than the first crystallization initiation temperature of the alloy. Also, to prevent the formation of metal oxides deteriorating soft magnetic properties, other than α-Fe nanocrystal grains, and to obtain a homogeneous nanocrystal structure, it may be preferable to perform a heat treatment within a β range lower than the second crystallization start temperature.

In the step of performing a heat treatment, a crystalline phase α-Fe in which Fe atoms of the alloy composition included in an amorphous phase may have a body-centered cubic crystal structure (bcc) centered on a nucleus dispersed in the alloy may be formed. In this case, Cu or Y may be used as atoms acting as coagulation nuclei of nanocrystal grains.

An average particle diameter of the crystal grains formed by the heat treatment may be preferably 25 nm or less. When the average particle diameter of the nanocrystal grains is larger than the corresponding range, a problem of increasing coercive force and magnetic loss may occur.

To obtain nanocrystal grains of the above particle size, the temperature and time may be controlled during heat treatment, and the heat treatment time may be for 30 seconds to 1 hour. The heat treatment time may change depending on the temperature, and when the time is less than 30 seconds, the grain size of the nanocrystal grains may not be reached, and when the heat treatment time exceeds 1 hour, the grain size of the nanocrystal grains may become excessively coarser, and coercive force and magnetic loss may increase.

As a third aspect, the present disclosure may include an inductor manufactured from the alloy composition and the alloy powder described above.

An inductor may be one of components included in an electric circuit, and may generally refer to a coil (wound) which induces a voltage in proportion to the amount of change in a current, and may have properties of stabilizing a current in the electric circuit. To effectively have the properties of stabilizing the current, a soft magnetic material may be used.

The type and shape of the inductor of this aspect is not limited, but may include a toroidal inductor, an axial inductor, or a chip-type inductor (hereinafter, a chip inductor), or the like, and the inductor may be preferably a toroidal inductor or a chip inductor.

An inductor according to an embodiment of the present disclosure may include a coil formed of a conductor and a soft magnetic core provided in or between the coils.

The coil may be a conductor connected to an electric circuit, may protrude to the outside of the inductor and may connected to the electric circuit, or may be in contact with an electrode electrically connectable to the outside of the inductor, and may be a component through which current flows by the electric circuit.

The coil may have a different shape and structure depending on the shape and type of the inductor. For example, an electrically conductive wire such as a copper wire may be rotated and wound on the outside of the soft magnetic core, and may be a laminated type in which conductive paste may be printed and laminated on a magnetic sheet in a coil pattern, or a coil may be wound in a spiral form using a winding device and the soft magnetic core may be filled in inside and outside the coil.

The inductor core may also have other shapes and structures depending on the shape and type of the inductor. For example, in the case of a toroidal inductor, a ring shaped or torus-shaped core may be included, and in the case of an axial inductor, a cylindrical core may be included, and a coil may be wound on the outside of the core.

An inductor according to a preferable embodiment of the present disclosure may be a chip inductor, and may include a core surrounding the inside and outside of the wound coil.

When the chip inductor according to this embodiment is used in an electronic circuit, permeability may be maintained above a certain level in the frequency range of 1 to 10 MHz, which may be advantageous, and the chip inductor may be used in the high frequency band of 1 to 10 MHz. As the chip inductor is manufactured to have a small volume and size, space efficiency and miniaturization may be important, and the chip inductor may be used for smartphones, tablet PCs, and laptops which may low current, which may be advantageous.

Specifically, with respect to a mold prepared to have a chip-type inductor form, a conductive coil provided inside the mold may be included, and an inductor in which a core comprising alloy powder and provided in the space between the periphery and the conductive coil may be insulated from the coil in the mold and a core may be included therein may be manufactured.

The alloy powder filled in the inductor may be a soft magnetic alloy powder, and as the soft magnetic alloy powder, a powder having a unimodal distribution having a single distribution or a bimodal distribution may be used, and the soft magnetic alloy powders having different average particle diameters may be mixed and used.

When soft magnetic alloy powders having different average particle diameters are mixed, packing density of the space may improve as compared to the case of using a powder having a single average particle diameter, such that higher magnetic permeability and a higher saturation magnetic flux density may be obtained.

For example, a mixed powder of a first soft magnetic alloy powder having a first particle diameter and a second soft magnetic alloy powder having a second particle diameter smaller than the first particle diameter may be filled in the inductor, and the first particle diameter may have a particle diameter relationship of 4 to 13 times the second particle diameter preferably.

When the particle size exceeds the range, density which is proportional to the packing fraction may be lowered, magnetic permeability may be reduced, and a magnetic flux density may be reduced, such that inductor efficiency may be lowered.

Also, the soft magnetic alloy powder may have insulating properties on a surface to prevent loss caused by electromagnetic induction. When the surface of the soft magnetic alloy powder is not insulated, induced currents and eddy currents may be generated according to changes in an external magnetic field due to electrical connection.

For insulating properties, for example, the soft magnetic alloy powder may further include an insulating coating on the surface, or the soft magnetic alloy powder may have insulating properties by being mixed with an insulating binder or resin when the powder is mixed.

In the inductor according to an embodiment of the present disclosure, a mixture of a soft magnetic alloy powder and a polymer resin may be filled in the inductor.

In this case, the composition and components of the binder are not limited, and any binder material having a composition generally used in the art or may be adopted by a person skilled in the art may be included in the inductor of the present disclosure.

When the binder and the soft magnetic alloy powder are mixed with each other, the binder may be preferably 1.5 to 5.0 weight % based on the soft magnetic alloy powder.

When the blending ratio of the binder is too small, the soft magnetic alloy powder may agglomerate with each other and it may be difficult to mix with the binder. When the blending ratio of the binder is too high, the amount of soft magnetic alloy powder may be reduced such that magnetic permeability and magnetic flux density may be lowered, or the bonding strength between the powder-binder may be lowered, which may lead to process defects such as electrode exposure, short circuit, and plating spread.

The higher the content of the soft magnetic alloy powder is, the better soft magnetic properties of the core may be, which may be preferable, but due to the properties of the structure of the chip inductor in which the coil is included in the inductor and the properties of the process of manufacturing the chip inductor, there may be a limitation in the content of the powder.

Specifically, the content of the soft magnetic alloy powder included in the soft magnetic core portion excluding an internal coil of the entire chip inductor may be 70 to 90 vol %, preferably 75 to 85 vol %.

Another preferred embodiment according to this aspect may be a toroidal inductor. A toroidal inductor may include a coil in which a soft magnetic core including alloy powder may be formed in a toroidal shape (including a donut or ring shape), and may include a coil provided by being wound on the surface of the toroidal core. In this case, the coil may be insulated from the toroidal core and may be wound.

A toroidal inductor may be different from the chip-type inductor of the above-described embodiment in appearance and form, but the operating principle and detailed configuration of the inductors may be the same. Hereinafter, the same portions as those of the chip inductor of the above-described embodiment will not be provided and different portions will be described.

When a toroidal inductor is used in an electronic circuit, permeability may be maintained above a certain level in the frequency range of several hundred kHz, which may be advantageous, and the toroidal inductor may be used in a frequency band of several tens to hundreds of kHz, may be used in electronic devices which may be manufactured in a relatively large volume and may not require miniaturization, may use high current, and may be used in an electronic device easily dissipating heat.

A toroidal inductor may be used, for example, in an medical device, communication, instrument, industrial control, refrigeration equipment, air conditioning equipment, power supply device, ballast, electronic clutch, electromagnetic brake, aerospace field, or the like, may mainly have a role of filtering noise generated in a circuit.

A toroidal core may be a torus having a circular or quadrangular cross-section, may have a rotationally symmetric structure, and does not include angled edges, such that there may be no loss caused by concentration of a magnetic field formed inside the core, that is, a magnetic flux linkage, and the magnetic field may be uniform, such that the core may be efficiently used.

A toroidal core may be manufactured autonomously, and may become an inductor by winding a coil on the surface, such that the toroidal core may be freely formed or manufactured as compared to a chip-type inductor, which may be advantageous. For example, in the case of manufacturing a chip-type inductor, it may be limited to press the alloy powder to prevent breakage of the coil while maintaining insulation from the coil provided inside the core, but in the case of a toroidal inductor, the core may be pressed close to a theoretical density only with alloy powder or may be heat-treated to increase magnetic permeability and a magnetic flux density.

That is, the alloy powder included in the toroidal core may be preferably a soft magnetic alloy powder, and the content or volume fraction of the alloy powder compared to the core of the chip inductor may be higher. For example, the volume occupied by the soft magnetic alloy powder in the entire core may be 95 vol % to 99.9 vol %.

The method of manufacturing the toroidal inductor may be divided into a method of manufacturing a toroidal core and a step of winding a coil, differently from a method of manufacturing a chip-type inductor.

As a step of manufacturing the toroidal core, for example, a method of mixing the soft magnetic alloy powder and the binder in a toroidal core type mold, forming in a toroidal shape by pressing by pressure which may be most 20 times higher than in the case of the chip inductor, and performing a heat treatment at a temperature of several hundred degrees.

In this case, the heat treatment may release stress in the material generated during the manufacturing of soft magnetic powder and pressure forming process such that soft magnetic properties such as magnetic permeability, investment loss, and magnetic flux density may greatly improve.

As a fourth aspect, the present disclosure discloses a motor comprising a soft magnetic material made from the alloy composition described above.

A motor, also referred to as an electric motor, may be a device which may convert electrical energy into mechanical energy (power, or the like), and may be a device using the principle that a conductor through which electric current flows receives a physical force in a magnetic field, and may generate a rotating magnetic field using electrical energy, and may generate kinetic energy such as rotational energy by a rotating magnetic field.

The motor may rotate by a rotating magnetic field and may include a rotor connected to a rotation shaft and a stator fixed to stop or not move and allowing the rotor to rotate, and may have various structures depending on the type (a direct current or alternating current) and the type of power to be used.

The motor of this aspect may be preferably an AC motor operating by receiving an AC supply, and the structure and shape of the stator and the rotor are not limited.

The motor may include a soft magnetic core including a soft magnetic material in a stator or rotor. Hereinafter, the soft magnetic core provided in the stator or rotor of the motor is referred to as a motor core. One of the stator or rotor may include a soft magnetic motor core and a coil wound around the motor core, and the other of the stator or rotor not including a motor core may include a permanent magnet having N and S poles.

That is, the motor may include a motor core in which a coil is wound, and the motor core may be provided in one of a stator and a rotor according to the structure of the motor.

The motor may have a plurality of coils and a bobbin (or a bobbin portion) on which the plurality of coils are wound, and the plurality of coils may be wound on a bobbin of a plurality of divided motor cores (split cores) which may individually separated, may be integrally formed, and the plurality of coils may be wound on a single motor core including a plurality of bobbin portions.

In this case, the plurality of coils does not necessarily require to include a plurality of conductors through which current flows, and although the plurality of coils are connected by a single conductor, the plurality of coils may be wound in different positions, such that the case in which separate wound coils are provided may be included.

A preferred embodiment of this aspect may be an axial gap motor including a housing, and a stator and a rotor may be arranged in an axial direction therein, and the motor may include a rotation shaft rotatably supported by the center of the housing, a stator including a plurality of divided cores radially arranged around the rotation shaft and a coil wound around the core, and a rotor arranged with a certain distance (air gap) from one surface of the stator core in the direction of the rotation shaft and having a central portion connected to the rotation shaft.

Another preferred embodiment of this aspect may be a radial gap motor including a housing, and a stator and a rotor may be arranged radially or radially from a rotation shaft therein, and the motor may include the rotation shaft rotatably supported by the center of the housing, a rotor having a plurality of magnets arranged radially on the outer circumferential surface around the rotation shaft, and a stator disposed with a certain distance (air gap) from the outer circumferential surface of the rotor in the radial direction with respect to the rotor and including a plurality of motor cores fixed to the housing and a coil wound around the motor core.

Here, the motor core may have teeth, and an insulating bobbin provided outside the coil, and the coil may be wound around the bobbin.

To manufacture the motor core, an alloy may be prepared in the form of a ribbon and may be processed into a desired shape, and in this case, the alloy may be a soft magnetic alloy, and the motor core may be formed by laminating a processed soft magnetic alloy ribbon and bonding the ribbon to each other, or by manufacturing the soft magnetic alloy in a powder form and sintering, injecting, or laminating the powder to have a desired shape. Preferably, the soft magnetic alloy may be prepared using a soft magnetic material in the form of a thin plate, such as a ribbon, and may be processed, laminated, and bonded, thereby manufacturing the motor core.

An embodiment of this aspect may include a motor having a stator or a rotor provided with a motor core manufactured by forming the alloy composition to have a ribbon shape and bonding the ribbon, and as the core of the motor, one of a motor core and a split core provided integrally may be used.

When the motor core is manufactured by forming the alloy included in the motor core in the form of a ribbon and bonding the ribbon, the respective ribbons may be insulated from each other preferably, and the direction in which the soft magnetic material formed by forming the soft magnetic alloy in the form of ribbon is laminated and the direction in which the coil is wound around the soft magnetic material may be defined. The winding direction refers to the direction in which the conductive wire moves while surrounding the soft magnetic material, and when a current changes along the winding, an induced magnetic field may be generated in the coil in the winding direction or in an opposite direction to the winding direction.

The lamination direction of the soft magnetic material may be a direction in which the soft magnetic alloy ribbon of a thin thickness is laminated, and may refer to the direction perpendicular to the bonding surface between the soft magnetic alloy ribbons.

The lamination direction and the winding direction of the soft magnetic alloy ribbon may be the directions perpendicular to each other preferably, which is an example of the soft magnetic material, where the perpendicular direction may not be exactly perpendicular, and may also include the direction close to being perpendicular or vertical generally in a broad sense.

One embodiment of the present disclosure may be a motor including the alloy composition material of the aspect described above, and by including a stator or rotor including an iron-based soft magnetic alloy material including Y, corrosion resistance of the stator or rotor may improve. Accordingly, operating lifespan of the motor may improve, and excellent soft magnetic properties may be obtained, such that high efficiency may be obtained.

Hereinafter, preferred embodiments are presented to help the understanding of the present disclosure, but the examples are merely examples of the present disclosure, and it will be understood by those skilled in the art that the various changes and modifications may be made within the scope and spirit of the present disclosure, that such changes and modifications may fall within the scope of the appended claims.

EXAMPLE

Examples 1 to 4—Manufacturing of Alloy Ribbon

The alloy composition was prepared in the composition ratio as in Table 1 below, and an amorphous alloy ribbon was prepared using a melt spinner device having a wheel speed of 3500 RPM, a gas pressure of 0.5 bar, and a nozzle-wheel gap of 1.0 mm.

Thereafter, the prepared amorphous alloy ribbon was heat-treated for 20 minutes at a temperature of 420° C. under an argon atmosphere.

Examples 5 to 8—Manufacturing of Alloy Ribbon

An alloy composition was prepared in the composition ratio as in in Table 1 below, and an alloy ribbon was prepared in the same manner as in Examples 1 to 4, other than the process that the heat treatment of the alloy ribbon was performed at a temperature of 450° C. for 10 minutes.

COMPARATIVE EXAMPLE

Comparative Examples 1 to 5—Manufacturing of Alloy Ribbon

An alloy composition was prepared in the composition ratio as in Table 1 below, and an alloy ribbon was manufactured under the same conditions using the same device as in the examples, the alloy ribbons of comparative examples 1 and 2 were heat-treated at a temperature of 420° C. for 20 minutes, and the alloy ribbons of comparative examples 4 and 5 were heat-treated at a temperature of 450° C. for 10 minutes.

tive examples 3 to 5 were analyzed in the same manner, and the results of examples 5 to 7 were illustrated in FIG. 3.

As a result of XRD analysis, it was found that an amorphous phase was observed with respect to the compositions of the examples and the comparative examples, and although not illustrated in the drawings, a crystalline phase of Fe (alpha-iron) was formed in comparative example 3.

Experimental Example 2: XRD Analysis After Heat Treatment

A heat treatment was performed at a temperature of 420° C. or 450° C., the alloy ribbons of examples 1 to 8 and comparative examples 1, 2, 4, 5 were analyzed using an XRD analysis device, and the results of examples 1 to 7 and comparative examples 1 to 2 were illustrated in FIGS. 4 to 6, respectively.

In comparative example 3, as it was observed that a crystalline phase of Fe was formed before the heat treatment, the heat treatment was not performed.

As compared with experimental example 1, it was confirmed that crystalline alpha-iron was detected in each the example and comparative example after heat treatment.

Experimental Example 3: DSC Analysis

The alloy ribbons of examples 1 to 8 and comparative examples 1 to 5 were thermally analyzed using a differential scanning calorimetry (DSC) equipment at a heating rate of 20° C./min, and the results of examples 1 to 7 and comparative examples 1 to 2 were illustrated in FIGS. 7 to 9.

As a result of DSC analysis, the first crystallization temperature ($T_{x1}$) and the second crystallization temperature ($T_{x2}$) increased as the content of Y was increased while

TABLE 1

|  | Fe (at %) | Si (at %) | B (at %) | P (at %) | Cu (at %) | Y (at %) | C (at %) | B + P + Y (at %) | Cu/Y value |
|---|---|---|---|---|---|---|---|---|---|
| Example 1 | 83 | 1.5 | 8 | 6 | 0.5 | 1 | 0 | 15 | 0.5 |
| Example 2 | 82 | 1.5 | 8 | 6 | 0.5 | 2 | 0 | 16 | 0.25 |
| Example 3 | 83.25 | 1 | 10 | 4 | 0.75 | 1 | 0 | 15 | 0.75 |
| Example 4 | 82.25 | 1 | 10 | 4 | 0.75 | 2 | 0 | 16 | 0.375 |
| Example 5 | 82 | 1.5 | 8 | 7 | 0.5 | 1 | 0 | 16 | 0.5 |
| Example 6 | 82.5 | 5 | 4 | 7 | 0.5 | 1 | 0 | 12 | 0.5 |
| Example 7 | 81.55 | 2.25 | 12 | 1.7 | 1.5 | 1 | 0 | 14.7 | 1.5 |
| Example 8 | 81 | 3.9 | 9 | 2.9 | 2.4 | 0.8 | 0 | 12.7 | 3.0 |
| Comparative example 1 | 84 | 1.5 | 8 | 6 | 0.5 | 0 | 0 | 14 | — |
| Comparative example 2 | 84.25 | 1 | 10 | 4 | 0.75 | 0 | 0 | 14 | — |
| Comparative example 3 | 82.3 | 7.5 | 6 | 1.7 | 1.5 | 1 | 0 | 8.7 | 1.5 |
| Comparative example 4 | 78.6 | 1.0 | 13 | 5 | 0.4 | 2 | 0 | 20.0 | 0.2 |
| Comparative example 5 | 82.45 | 4.0 | 10 | 1.7 | 1.5 | 0.35 | 0 | 12.05 | 4.29 |

EXPERIMENTAL EXAMPLE

Experimental Example 1: XRD Analysis Before Heat Treatment

XRD analysis was performed for the alloy ribbons of examples 1 and 2 and comparative example 1 before heat treatment, and results of the analysis on the wheel surface on which cooling occurs at a fast rate, and the air surface on which the cooling rate is relatively low during the manufacture of the alloy ribbon were illustrated in FIG. 1.

The alloy ribbons of examples 3, 4 and comparative example 2 were analyzed in the same manner before performing heat treatment, and the results were illustrated in FIG. 2. The alloy ribbons of examples 5 to 8 and comparamaintaining the composition of other components other than Fe in the examples and comparative examples, and it can be observed that, as the rate of increase of the second crystallization temperature is higher, $\Delta T$ calculated as ($T_{x2}-T_{x2}$) also increased.

Also, it is indicated that the value of $\Delta T$ in example 7 was about 179° C., which may be relatively large.

Experimental Example 4: VSM Analysis

As for the alloy samples of examples 1 to 8 and comparative examples 1 to 5, a saturation magnetic flux density (Bs) was measured in a magnetic field of 800 kA/m using a vibrating specimen magnetometer (VSM), and the results were summarized and listed in Table 2. Overall, the saturation magnetic flux density increased after the heat treatment, and it was expected that a higher saturation magnetic flux density was obtained because Fe formed nanometer-scale grains therein during the heat treatment.

Additionally, the results of the above-described experimental examples are summarized and listed in Table 3 below.

TABLE 2

| | Bs (T) | |
|---|---|---|
| | As-spun | After heat treatment |
| Example 1 | 1.34 | 1.64 |
| Example 2 | 1.27 | 1.56 |
| Example 3 | 1.47 | 1.56 |
| Example 4 | 1.41 | 1.52 |
| Example 5 | 1.31 | 1.5 |
| Example 6 | 1.28 | 1.48 |
| Example 7 | 1.24 | 1.58 |
| Example 8 | 1.22 | 1.56 |
| Comparative example 1 | 1.38 | 1.77 |
| Comparative example 2 | 1.53 | 1.55 |
| Comparative example 3 | 1.44 | 1.63 |
| Comparative example 4 | 1.21 | 1.49 |
| Comparative example 5 | 1.44 | 1.63 |

TABLE 3

| | XRD analysis | Saturation magnetic flux density, Bs (T) | | Crystallization temperature (° C.) | | |
|---|---|---|---|---|---|---|
| | Crystalline state | as-spun | After heat treatment | Tx1 | Tx2 | ΔT |
| Example 1 | Amorphous | 1.34 | 1.64 | 398 | 516 | 118 |
| Example 2 | Amorphous | 1.27 | 1.56 | 402 | 524 | 122 |
| Example 3 | Amorphous | 1.47 | 1.56 | 392 | 527 | 135 |
| Example 4 | Amorphous | 1.41 | 1.52 | 394 | 532 | 138 |
| Example 5 | Amorphous | 1.31 | 1.5 | 398 | 510 | 112 |
| Example 6 | Amorphous | 1.28 | 1.48 | 369 | 513 | 144 |
| Example 7 | Amorphous | 1.24 | 1.58 | 355 | 534 | 179 |
| Example 8 | Amorphous | 1.22 | 1.56 | 396 | 507 | 111 |
| Comparative example 1 | Amorphous | 1.38 | 1.77 | 395 | 511 | 116 |
| Comparative example 2 | Amorphous | 1.53 | 1.55 | 383 | 515 | 132 |
| Comparative example 3 | Crystalline | 1.44 | 1.63 | — | 527 | — |
| Comparative example 4 | Amorphous | 1.21 | 1.49 | 406 | 526 | 120 |
| Comparative example 5 | Amorphous | 1.44 | 1.63 | 410 | 512 | 102 |

While the example embodiments have been illustrated and described above, it will be apparent to those skilled in the art that modifications and variations could be made without departing from the scope of the present disclosure as defined by the appended claims.

The invention claimed is:

1. An alloy composition expressed by a compositional formula $Fe_aSi_bB_cP_dCu_eY_f$,
   wherein a to g satisfy $80 \leq a \leq 87$, $0 < b \leq 9$, $3 \leq c \leq 14$, $1 \leq d \leq 8$, $0.2 \leq e \leq 2.5$, $0.5 \leq f \leq 3.0$-2.5 and $(e/f) \leq 4$ in an atomic percentage value,
   wherein a difference between a first crystallization temperature ($T_{x1}$) and a second crystallization temperature ($T_{x2}$) of the alloy composition is 170 to 190° C.

2. The alloy composition of claim 1, wherein the compositional formula satisfies $10 \leq (c+d+f) \leq 19$.

3. An alloy ribbon formed of the alloy composition of claim 1.

4. The alloy ribbon of claim 3, wherein the alloy ribbon includes crystal grains including Fe and an amorphous phase in which the crystal grains are dispersed.

5. An alloy powder formed of the alloy composition of claim 1.

6. The alloy powder of claim 5, wherein the alloy powder includes crystal grains including Fe and an amorphous phase in which the crystal grains are dispersed.

7. An inductor, comprising:
   a wound coil; and
   a soft magnetic core including the coil therein,
   wherein the soft magnetic core includes the alloy composition of claim 1, and has a composite structure in which crystal grains including Fe are dispersed in an amorphous phase.

8. The inductor of claim 7, wherein the soft magnetic core is a sintered body in which the alloy powder having the composition is insulated from each other and is sintered.

9. The inductor of claim 7, wherein crystal grains including Fe include α-Fe.

10. The inductor of claim 9, wherein an average particle diameter of crystal grains including Fe is 25 nm or less.

11. A motor, comprising:
    a housing;
    a rotation shaft supported by a center of the housing;
    a rotor connected to the rotation shaft; and
    a stator fixed to the housing,
    wherein the rotor or the stator includes a motor core on which a coil is wound, and
    wherein the motor core includes the alloy composition of claim 1, and a complex structure in which crystal grains including Fe are dispersed in an amorphous phase is included.

12. The motor of claim 11, wherein, in the motor core, the alloy is processed into a soft magnetic alloy ribbon and the ribbon is laminated.

13. The motor of claim 12, wherein, in the motor core, the soft magnetic alloy ribbon is laminated in a direction perpendicular to a winding direction of the coil.

14. The motor of claim 11, wherein the crystal grains including Fe include α-Fe.

15. The motor of claim 14, wherein an average particle diameter of the crystal grains including Fe is 25 nm or less.

* * * * *